United States Patent [19]

Dunn

[11] 3,843,698

[45] Oct. 22, 1974

[54] CATALYTIC COMPOUNDS

[75] Inventor: James H. Dunn, Baton Rouge, La.

[73] Assignee: Ethyl Corporation, Richmond, Va.

[22] Filed: Dec. 13, 1971

[21] Appl. No.: 207,515

Related U.S. Application Data

[63] Continuation-in-part of Ser. No. 819,116, April 24, 1969.

[52] U.S. Cl............ 260/429 R, 252/431 N, 260/578
[51] Int. Cl. .............................................. C07j 5/00
[58] Field of Search .................... 260/429 R, 666 A; 252/431 N

[56] References Cited
UNITED STATES PATENTS

| | | | |
|---|---|---|---|
| 2,459,966 | 1/1949 | Schilling | 260/448 R |
| 2,814,646 | 11/1957 | Kolka et al. | 252/431 N |
| 3,053,871 | 9/1962 | Aries | 260/429 R |
| 3,124,621 | 3/1964 | Crain et al. | 260/666 A |
| 3,208,986 | 9/1965 | Mazzanti et al. | 252/431 N |
| 3,297,733 | 1/1967 | Kornicker | 252/431 N |
| 3,347,893 | 10/1967 | Hogsett et al. | 260/448 R |
| 3,360,578 | 12/1967 | Chappel | 260/666 A |
| 3,394,156 | 7/1968 | Kornicker | 260/429.5 |
| 3,607,257 | 9/1971 | Johnson | 260/429 R |
| 3,654,331 | 4/1972 | Klopfer | 252/431 N |

OTHER PUBLICATIONS

Aniline, publication of National Aniline Division of Allied Chemical, 1964, p. 72.
Sheka et al., The Chemistry of Gallium, Elsevier Publishing Co., N.Y., 1966, p. 133.
Von Richter, A Text-Book of Inorganic Chemistry, Blakiston, Son and Co., Philadelphia, 1894, p. 359.

*Primary Examiner*—Daniel E. Wyman
*Assistant Examiner*—A. P. Demers
*Attorney, Agent, or Firm*—Donald L. Johnson; Robert A. Linn; Joseph D. Odenweller

[57] ABSTRACT

Aromatic amines such as aniline are selectively alkylated predominantly in the ortho position by heating the aromatic amine with a olefin in the presence of a gallium anilide catalyst. The reaction is promoted by Friedel-Crafts catalysts. The products are useful as gasoline and rubber stabilizers and as chemical intermediates.

7 Claims, No Drawings

CATALYTIC COMPOUNDS

This application is a continuation-in-part of application Ser. No. 819,116, filed Apr. 24, 1969.

BACKGROUND

Aromatic amines are useful in a broad range of applications. For example, they are antiknock agents in gasoline used in spark ignited internal combustion engines. They are also beneficial when added to rubber, wherein they prevent degradation caused by ozone. Another use in particular for anilines substituted in an ortho position with an ethyl radical is in the preparation of indole and indole derivatives. For example, orthoethylaniline is converted to indole by contact with a titanium dioxide catalyst at a temperature of around 600° C. (U.S. Pat. No. 2,886,573).

Methods of orthoalkylating aromatic amines such as aniline are known. Suitable methods are disclosed by Stroh et al in U.S. Pat. No. 2,762,845, Kolka et al in U.S. Pat. No. 2,814,646, and again by Stroh et al in U.S. Pat. No. 3,275,690. In Stroh et al U.S. Pat. No. 2,762,845 the alkylation is carried out with an olefin in the presence of aluminum. Kolka et al carry out the alkylation using an olefin in the presence of an aluminum anilide. Likewise, Stroh et al U.S. Pat. No. 3,275,690 carry out the alkylation using olefin and a Friedel-Crafts catalyst, optionally in the presence of aluminum. Thus, the prior art methods all envision the use of aluminum compounds as catalysts.

SUMMARY

It has now been found that an aromatic amine having at least one hydrogen atom on a nuclear carbon atom ortho to a primary or secondary amino group can be alkylated selectively in the ortho position by heating the aromatic amine with an olefin in the presence of a gallium anilide catalyst at temperatures of from about 150°–500° C. The alkylation can be promoted by the addition of a Friedel-Crafts catalyst such as aluminum chloride. Accordingly, an object of the invention is to provide a process for selectively orthoalkylating aromatic amines.

DESCRIPTION OF THE PREFERRED EMBODIMENTS

The above and other objects are accomplished by providing a process for selectively alkylating the nucleus of an aromatic amine having at least one hydrogen atom bonded to a nuclear carbon atom ortho to an amino group and having at least one hydrogen atom bonded to said amino group, said process comprising heating said amine with an olefin in the presence of a gallium anilide catalyst at a temperature of from about 150°–500° C.

The process can be carried out on any aromatic amine that (1) has at least one hydrogen atom on a carbon atom ortho to an amino group, and (2) has at least one hydrogen atom on the amino group. In other words, the process is applicable to primary or secondary aromatic amines having at least one unsubstituted ortho position. These include both mono- and poly- nuclear aromatic amines as well as mono- and polyamino aromatic amines. Suitable amines include the amino benzenes, amino naphthalenes, amino anthracenes, amino phenanthrenes, amino chrysenes, amino pyrenes, and the like.

The aromatic amines can also have other nuclear substituents such as alkyl, aryl, alkaryl, aralkyl, cycloalkyl, substituted-cycloalkyl, halogen, alkoxy, aryloxy, and the like. Likewise, the nuclear substituents may form a closed ring such as in the case of indene. All that is required is that at least one position ortho to the amine radical is unsubstituted except for hydrogen, and that the amine nitrogen atom have at least one hydrogen atom bonded thereto. Of the various aromatic amines, the preferred are the mono-, di- or tri- nuclear amines. In particular, the amino benzenes are most useful.

Examples of suitable amines include:
m—toluidine
o—toluidine
4—isobutylaniline
4—sec—eicosylaniline
N—methylaniline
2—tert—butylaniline
4—phenylaniline
4—α—methylbenzylaniline
4,4'—methylenebisaniline
4,4'—isopropylidenebisaniline
p—phenylenediamine
N,N'—dimethyl—p—phenylenediamine
6—sec—eicosyl—α—naphthylamine
α—naphthylamine
β—naphthylamine
N—methyl—α—naphthylamine
α—aminoanthracene
3—aminophenanthrene
7—aminoindene
1—aminochrysene
2—aminopyrene
4—cyclohexylaniline
4—phenylaniline The most preferred amines are the mononuclear aromatic amines, especially the primary and secondary amino benzenes, referred to collectively as anilines. Examples of these are:
aniline
N—methylaniline
N—ethylaniline
p—sec—docosylaniline
p—methoxyaniline
p—bromoaniline
N—butyl—m—bromoaniline Of these, the most preferred aromatic amine is aniline itself.

The olefins useful in the process include olefins which are both mono- or poly- unsaturated, cyclic or acyclic, substituted or unsubstituted, and both terminal and internal olefins. Examples of acyclic monoolefins are ethylene, propylene, butene—1, butene—2, isobutene, pentene—1, isopentene, pentene—2, hexene—1, hexene—2, 2—methyl pentene—1, 2—methyl pentene—2, n—decene—1, 2—ethyl octene—1, 2—ethyl octene—2, n—decene—2, dodecene—1, 2—ethyl decene—1, 2—ethyl decene—2, dodecene—2, octadecene—1, octadecene—2, 2—methyl heptadecene—1, diisobutylene, eicosene—1, eicosene—2, 2—ethyl otadecene—1, docosene—1, docosene—2, triacontene—1, 2—ethyl octacosene—1, tetracontene—2, pentacontene—1, and the like.

Examples of cyclic monoolefins are cyclopentene, cyclohexene, cyclooctene, 1—methylcyclohexene, 1—butylcyclohexene, 1—methylcyclooctene, and the like.

Useful acyclic polyenes include 1,3—butadiene, 2—methyl—1,3—butadiene, 2,3—dimethyl—1,3—butadiene, 1,4—pentadiene, and the like. Some useful cyclic polyenes are cyclopentadiene, dicyclopentadiene, 1,3—cyclooctadiene, 1,3—cyclopentadiene, 1,4—octadiene, 1,3,5—cyclooctatriene, and the like.

The substituted olefins can have any substituents that do not interfere with the reaction. Examples of such substituents are halogens, alkoxy groups, aryloxy groups, aryl rdicals, and the like. Illustrative examples of such olefins are 2—chloro—1,3—butadiene, vinyl chloride, allyl chloride, vinyl bromide, ethyl vinyl ether, phenyl vinyl ether, butyl vinyl ether, lauryl acrylate, methyl acrylate, indene, α—methyl styrene, 4—dodecyl styrene, 4—sec—octyl—α—methyl styrene, and the like.

In general, the preferred olefin reactants are the acyclic monoolefins containing from 2-50 carbon atoms, cyclic olefins containing from 5-10 carbon atoms, and aryl-substituted monoolefins containing from 8-20 carbon atoms. Especially preferred are the lower hydrocarbon monoolefins containing from two to about six carbon atoms such as ethylene, propylene, butene—1, isobutene, pentene—1, pentene—2, isopentene, hexene—1, hexene—2,2—methyl—pentene—1, cyclohexene, and the like.

The amount of olefin added to the aromatic amine will vary depending upon whether mono- or di- alkylation is desired. The precise amount is not a critical feature of the process. In general, from about 0.5 mole equivalent to 8 mole equivalents of olefin are added for each mole of aromatic amine. A most useful range is from about one mole equivalent to 3 mole equivalents of olefin for each mole equivalent of aromatic amine.

The process proceeds best at elevated temperatures. A useful range is from about 150°-500° C. A preferred temperature range is from about 200°-400° C., and best results are usually obtained at about 300°-350° C.

The pressure under which the reaction is conducted is not an independent variable, and varies with the temperature and vapor pressure of the reactants. With the more volatile lower olefins such as ethylene, the reaction pressure will be quite high, while with the higher olefins only moderate pressures will be observed. Depending upon the reactants and the temperature, the pressure will range from about atmospheric to 2,500 psig.

The process should be conducted under a substantially inert atmosphere. Excessive amounts of oxygen or moisture will stop the alkylation by destroying the catalyst. This is not to say that the reactants need be absolutely anhydrous, but only that they should be substantially anhdyrous. Also, the amount of oxygen in the reaction vessel should be minimized, generally by flushing the reaction vessel with an inert gas such as nitrogen, methane, ethane or propane, prior to conducting the reaction.

The reaction can be conducted in the presence of an inert solvent. Suitable solvents include aromatic and aliphatic hydrocarbons. Examples of useful aromatic hydrocarbons are toluene, xylene, mesitylene, and the like. Examples of useful aliphatic hydrocarbons are hexane, n—octane, isooctane, decane, and the like.

Alkylation time depends on temperature, amount of catalyst and on the particular aromatic amine and olefin used. In general, the alkylation takes from 1 to 8 hours. A preferred reaction time is from 1 to 4 hours.

The term "gallium anilide catalyst" is used in a generic sense and means a gallium compound in which at least one aromatic amine is bonded to the gallium through the amino nitrogen atom. The amount of gallium anilide type catalyst used in the reaction should be sufficient to catalyze the alkylation at a reasonable rate. The amount of catalyst is generally expressed in terms of the number of moles of aromatic amine per mole of gallium in the form of a gallium anilide. Good results are generally obtained when from about 5-40 moles of aromatic amines are present for each mole of gallium as a gallium anilide. A preferred range is from about 7-25 moles of aromatic amine per mole of gallium anilide.

The gallium anilide is readily prepared by reacting an alkali or alkaline earth metal anilide compound with a gallium halide, resulting in the metathetical elimination of an alkali or alkaline earth metal halide with the formation of a gallium anilide catalyst. For example, the reaction of sodium anilide with gallium chloride forms gallium anilide.

The gallium anilide is preferably prepared in situ in an excess of the aromatic amine to be alkylated. If desired, it can be isolated from the excess aromatic amine by adding an aliphatic hydrocarbon such as pentane, hexane, heptane, and the like, causing it to precipitate.

The gallium anilide formed will correspond with the aryl amine used in its preparation including those aryl amines previously listed. Some examples of the resultant gallium anilides are tris(m—toluidino)gallium, tris(o—toluidino)gallium, tris(4—isobutylanilino)gallium, tris(4—sec—eicosylanilino)—gallium, tris(N—methylanilino)gallium, tris(2—tert—butylanilino)—gallium, tris(4—phenylanilino)gallium, tris(α—naphthylamino)—gallium, tris(β—naphthylamino)gallium, and the like. The most useful catalyst is tris—anilino gallium.

When the gallium anilide is prepared using less than 3 moles of alkali metal anilide per mole of gallium halide the resultant compound contains anilino gallium halide. For example, if 2 moles of sodium anilide are reacted with one mole of gallium chloride the resultant compound is dianilino gallium chloride. These compounds are also excellent catalysts for the orthoalkylation of aromatic amines and, in fact, give faster reaction rates than the tris-anilino gallim compounds. They have the formula

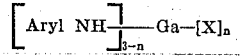

wherein $n$ is 1 or 2. Some examples of these compounds are: dianilino gallium fluoride, dianilino gallium bromide, dianilino gallium chloride, dianilino gallium iodide, anilino gallium dichloride, anilino gallium difluoride, anilino gallium diiodide, anilino gallium dibromide, di(m—toluidino) gallium chloride, di(o—toluidino) gallium bromide, and the like.

It is sometimes desirable to add a Friedel-Crafts catalyst to the aromatic amine prior to heating with an olefin in the presence of a gallium anilide catalyst. Friedel- Crafts catalysts act as promoters for the gallium anilide catalysts. suitable Friedel-Crafts catalysts include the conventional Lewis acids such as aluminum chloride, aluminum bromide, boron trichloride, boron trifluoride, zinc trichloride, titanium tetrachloride, zirconium chloride, gallium chloride, and the like. The amount used should be sufficient to promote the reaction to a rate higher than that obtained with the gallium anilide catalyst alone. This amount can vary from about 0.001 to 0.05 mole parts per mole of aromatic amine. A preferred range is from about 0.01 to 0.04 moles per mole of aromatic amine.

The alkylation is readily carried out by merely preparing a suitable gallium anilide catalyst and adding it to the aromatic amine to be alkylated, or, alternatively, preparing the gallium anilide type catalyst directly in the aromatic amine to be alkylated. Olefin corresponding to the desired alkyl group is then added to the aromatic amine mixture and heated to alkylation temperature. Generally, only part of the olefin is added at the start of the reaction, and more is employed as the alkylation proceeds. The manner in which the alkylation is carried out is readily understood from the following examples. All parts are by weight unless otherwise specified.

EXAMPLE 1

Preparation of Gallium Anilide

To a reaction vessel fitted with a stirrer and heating means was added 500 parts of benzene and 120 parts of sodamide. While stirring, 280 parts of aniline was added and the mixture heated to reflux for 1 hour, forming sodioanilide. The mixture was then cooled and 176 parts of anhydrous gallium chloride was slowly added. The mixture was refluxed for 4 hours and again cooled.

Alkylation

To a pressure reaction vessel fitted with stirrer and heating means was added one mole part of gallium anilide and 10 mole parts of aniline. The vessel was flushed with nitrogen and then pressurized with ethylene to 500 psig. The mixture was heated to 335° C. and ethylene continuously added to maintain the pressure around 500 psig. The alkylation was continued for 4 hours. Following this, the alkylation mixture was cooled and washed to remove the catalyst. Distillation yielded a mixture of 2—ethylaniline and 2,6—diethylaniline in good yield.

EXAMPLE 2

In a pressure reaction vessel place 930 parts of aniline, 46 parts of sodium metal and one part of copper oxide. Seal the vessel, flush with nitrogen and heat to 150° C. to form sodioanilide. After 30 minutes, cool and vent. Add 176.2 parts of gallium chloride, seal, and heat to 300° C., forming dianilino gallium chloride as the gallium anilide catalyst. Pressurize to 750 psig. with ethylene and continue heating to 350° C. Maintain the temperature at 330°–350° C. and the pressure at 750–1,000 psig. by adding ethylene. After 4 hours, cool and vent. Wash with 20 percent aqueous caustic and then distill to recover 2—ethylaniline and 2,6—diethylaniline in high yield.

Other aromatic amines can be alkylated following the above general procedure with good results. For example, o—toluidine will form 2—methyl—6—ethylaniline. Likewise, N—methylaniline forms principally N—methyl—2—ethylaniline. 4—Tert—butylaniline yields a mixture of 2—ethyl—4—tert—butylaniline and 2,6—diethyl—4—tert—butylaniline. Similarly, 4,4'—methylenebisaniline forms a mixture of o—ethylated aromatic amine containing as the principal products 4,4'—methylenebis—2—ethylaniline and 4,4'—methylenebis—2,6—diethylaniline. Likewise, p—phenylenediamine forms a mixture of nuclearly ethylated p—phenylenediamines. The polynuclear aromatic amine, α—aminoanthracene, will form 2—ethyl—α—aminoanthracene. Likewise, 2—aminopyrene forms both 1—ethyl—2—aminopyrene and 1,3—diethyl—2—aminopyrene. Halogenated aromatic amines such as p—bromoaniline leads to 2—ethyl—4—bromoaniline and 2,6—diethyl—4—bromoaniline.

In a pressure reaction vessel place 2,860 parts of α-naphthylamine, 69 parts of sodium metal and 5 parts of copper oxide. Heat to 150° C. and hold for 30 minutes. Cool and vent the hydrogen evolved. Add 176 parts of gallium chloride, seal, and heat to 180° C. Stir for 1 hour to form gallium trianilide catalyst. Cool to room temperature and add 44.5 parts of aluminum chloride promoter. Seal the vessel, flush with ethylene, and heat to 300° C. Pressurize with ethylene to 500 psig. and stir at 330°–360° C. and 750–900 psig. ethylene for 4 hours. Cool and vent. Wash the reaction mixture with 20 percent aqueous caustic and distill to recover 2—ethyl—α—naphthylamine.

Other Friedel-Crafts catalysts can be used as promoters in the above example with good results. Some examples are aluminum bromide, boron trifluoride, boron trichloride, zinc chloride, titanium tetrachloride, zirconium chloride, and the like.

EXAMPLE 4

In a pressure reaction vessel place 1,070 parts of N—methylaniline, 35 parts of sodium and one part of copper oxide. Heat to 175° C. for 30 minutes and cool. Vent the hydrogen and add 88 parts of gallium chloride. Seal and heat to 180° C. for 30 minutes. Cool and add 1,040 parts of styrene. Seal and heat to 330° C. and hold at 330°–350° C. for 2 hours. Cool and add an additional 1,040 parts of styrene, seal, and again heat to 330°–350° C. for 4 hours. Cool, wash with 20 percent aqueous caustic and distill to recover principally 2—(α—methylbenzyl)—N—methylaniline and some 2,6—di—(α—methylbenzyl)—N—methylaniline in good yield.

When cyclohexene is used in the above example the products are 2—cyclohexyl—N—methylaniline and 2,6—dicyclohexyl—N—methylaniline.

The rate of the alkylation in the above example can be increased by adding about 65 parts of aluminum chloride promoter or an equal mole amount of another Friedel-Crafts catalyst.

As stated previously, alkylated aromatic amines are useful in a broad range of applications. For example, they are antiknock agents for gasoline used in spark ignited internal combustion engines. They are also valuable intermediates in the dye industry. They are beneficial when added to rubber wherein they prevent degradation caused by oxygen and ozone. Another use in particular for anilines substituted in an ortho position with an ethyl radical is in the preparation of indole and indole derivatives. For example, o—ethylaniline is converted to indole by contact with a titanium dioxide catalyst at about 600° C. (U.S. Pat. No. 2,886,573). The orthoalkylated aromatic amines are also useful as intermediates for herbicides. For example, 2,6—dialkylanilines such as 2,6—diethylaniline are an intermediate in the preparation of the plant growth regulators described in U.S. Pat. No. 3,403,994.

I claim:

1. A catalytic compound adapted to catalyze the selective orthoalkylation of aromatic amines with olefinic hydrocarbons at a high rate and under moderate conditions, said compound being a gallium compound in which at least one aromatic amine is bonded to gallium through an amino nitrogen atom, any remaining gallium valence being substituted with halogen, said aromatic amine bonded to gallium through an amino nitrogen atom being an aromatic hydrocarbyl amine containing only carbon, hydrogen and nitrogen.

2. A compound of claim 1 wherein three aromatic amines are bonded to gallium through an amino nitrogen atom.

3. A compound of claim 2, namely, tris-anilino gallium.

4. A compound of claim 1 having the formula:

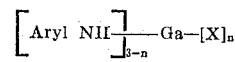

wherein $n$ is an integer selected from 1 and 2, X is halogen and aryl is an aromatic hydrocarbon group.

5. A compound of claim 4 wherein said halogen is chlorine.

6. A compound of claim 5, namely, dianilino gallium chloride.

7. A compound of claim 5, namely, anilino gallium dichloride.

* * * * *